US010807236B2

(12) United States Patent
Qi et al.

(10) Patent No.: US 10,807,236 B2
(45) Date of Patent: Oct. 20, 2020

(54) SYSTEM AND METHOD FOR MULTIMODAL MAPPING AND LOCALIZATION

(71) Applicants: Beijing Jingdong Shangke Information Technology Co., Ltd., Beijing (CN); JD.com American Technologies Corporation, Mountain View, CA (US)

(72) Inventors: Chengzhi Qi, Mountain View, CA (US); Hui Cheng, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 319 days.

(21) Appl. No.: 15/967,460

(22) Filed: Apr. 30, 2018

(65) Prior Publication Data

US 2019/0329407 A1 Oct. 31, 2019

(51) Int. Cl.
*B25J 9/16* (2006.01)
*G01S 17/89* (2020.01)
*G06T 7/73* (2017.01)

(52) U.S. Cl.
CPC .......... *B25J 9/1664* (2013.01); *B25J 9/1694* (2013.01); *B25J 9/1697* (2013.01); *G01S 17/89* (2013.01); *G06T 7/73* (2017.01); *G06T 2207/10004* (2013.01); *G06T 2207/10028* (2013.01); *Y10S 901/47* (2013.01)

(58) Field of Classification Search
CPC .............. G01S 17/89; B25J 9/16; G06T 7/73
See application file for complete search history.

(56) References Cited

U.S. PATENT DOCUMENTS

| 10,437,252 | B1* | 10/2019 | Liu | G05D 1/0212 |
|---|---|---|---|---|
| 10,496,104 | B1* | 12/2019 | Liu | G01S 19/14 |
| 2007/0262884 | A1* | 11/2007 | Goncalves | G05D 1/0231 340/995.24 |
| 2011/0082585 | A1* | 4/2011 | Sofman | B25J 9/1602 700/259 |
| 2012/0121161 | A1* | 5/2012 | Eade | G05D 1/0253 382/153 |

(Continued)

*Primary Examiner* — Kira Nguyen
(74) *Attorney, Agent, or Firm* — China Science Patent & Trademark US LLC; Shanyun Lu

(57) ABSTRACT

A system for mapping and localization includes first and second robotic devices and fiducial tags placed at predetermined positions of an environment. The quality of the first robotic device is better than the second robotic device. The first robotic device prepares a high resolution multilayer map, and the second robotic device uses the multilayer map for fast and accurate localization. The first robotic device has a visual sensor and a light detection and ranging (LIDAR) device, and is configured to prepare the multilayer map by: constructing a feature point cloud layer of the environment using images captured by the visual sensor; building a tag layer comprising identifications and locations of the tags; constructing an occupancy map using LIDAR scans; and forming the multilayer map having the feature point cloud layer, the tag layer, and the occupancy map layer, which share the same coordinate system.

17 Claims, 7 Drawing Sheets

(56) References Cited

U.S. PATENT DOCUMENTS

2018/0196439 A1* 7/2018 Levinson ............. G05D 1/0088
2018/0315007 A1* 11/2018 Kingsford ................ G06T 7/97
2019/0375102 A1* 12/2019 Wang .................. G06F 3/04842

* cited by examiner

SYSTEM AND METHOD FOR MULTIMODAL MAPPING AND LOCALIZATION

FIELD OF THE INVENTION

The present invention relates generally to the field of image processing, and more particularly to systems and methods for fast robot localization using multimodal.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

In robotics research, simultaneous localization and mapping (SLAM) can be implemented in many ways in combination with different sensor modalities, including light detection and ranging (LIDAR), camera, inertial measurement unit (IMU), global positioning system (GPS), etc. However, it is a challenge to achieve instant pose recovery and instant localization. Stereo-camera based visual inertial odometry (VIO) method can help a robot to recover a pose with instant shots from two frames, but the computational load for localization is very costly for large map and inaccuracy exists when the map has many similar areas/regions. Other methods like laser scan, radar scan, may require multiple scans to perform localization. GPS can guide the robot to do localization outdoor quickly with limited accuracy, but has very poor performance in indoor or poor signal environment.

Therefore, an unaddressed need exists in the art to address the aforementioned deficiencies and inadequacies.

SUMMARY OF THE INVENTION

In certain aspects, the present invention relates to a system for mapping and localization. In certain embodiments, the system includes a first robotic device for preparing a multilayer map and a plurality of tags placed in predetermined positions in an environment. The first robotic device has a first visual sensor for capturing first images of the environment and a first controller. The first controller includes a first processor and a first storage device storing first computer executable code. The first computer executable code, when executed at the first processor, is configured to:

construct a feature point cloud layer of the environment using the first images captured by the first visual sensor;

build a tag layer comprising identifications of the plurality of tags and locations of the plurality of tags; and form the multilayer map using the feature point cloud layer and the tag layer, wherein the feature point cloud layer and the tag layer share a same coordinate system.

In certain embodiments, the first robotic device further has a first light detection and ranging (LIDAR) device. The first executed computer executable code is configured to construct an occupancy map using scans captured by the first LIDAR device, and incorporate the occupancy map into the multilayer map as an occupancy map layer, such that the occupancy map layer, the feature point cloud layer and the tag layer has the same coordinate system.

In certain embodiments, the first robotic device further has a first inertial measurement unit (IMU) or a first wheel encoder mounted thereon. The first computer executable code, when executed at the first processor, is configured to update the multilayer map by:

capturing a current image by the first visual sensor;

extracting features from the current image;

matching the features extracted from the current image to features in an immediate previous key frame of the first robotic device, so as to obtain matched features;

recovering a current pose of the first robotic device based on the matched features;

updating the current pose of the first robotic device using measurement from the first IMU or the first wheel encoder to obtain updated current pose of the first robotic device;

detecting the tags from the current image;

computing poses of the tags based on the updated current pose of the first robotic device and location of the detected tags in the current image; and updating the multilayer map based on the updated current pose of the first robotic device and the poses of the tags.

In certain embodiments, the first computer executable code, when executed at the first processor, is further configured to: detect loop closure by matching the detected tags to the tags recorded in the tag layer of the multilayer map; and further updating the updated current pose of the first robotic device using the detected loop closure.

In certain embodiments, the system further includes a second robotic device. The second robotic device includes a second visual sensor for capture second images of the environment and a second controller. Resolution of the second visual sensor is lower than resolution of the first visual sensor. The second controller has a second processor and a second storage device storing second computer executable code. The second computer executable code, when executed at the second processor, is configured to localize the second robotic device by matching tags detected from the second images to location of the tags stored in the multilayer map.

In certain embodiments, the second robotic device further has a second light detection and ranging (LIDAR) device. The second executed computer executable code is configured to match features detected in scans of the LIDAR device to features stored in the occupancy map layer.

In certain embodiments, the second robotic device further has a second inertial measurement unit (IMU) or a second wheel encoder mounted thereon. The second computer executable code, when executed at the second processor, is configured to use the multilayer map by:

capturing a current localization image by the second visual sensor;

extracting features from the current localization image;

matching the features extracted from the current localization image to features in an immediate previous key frame of the second robotic device, so as to obtain matched features;

recovering a first current pose of the second robotic device based on the matched features;

detecting the tags from the current localization image;

computing a second current pose of the second robotic device based on the multilayer map and the detected tags; and updating pose of the second robotic device using the first current pose, the second current pose, and measurement from the first IMU or the first wheel encoder, to obtain updated current pose of the second robotic device.

In certain embodiments, the second computer executable code, when executed at the second processor, is further configured to update the updated current pose of the second robotic device by: detecting loop closure by matching the detected tags to the tags recoded in the tag layer of the multilayer map; and further updating the updated current pose of the second robotic device using the detected loop closure.

In certain aspects, the present invention relates to a method for mapping and localization. In certain embodiments, the method includes:

constructing a feature point cloud layer of an environment using first images captured by a first visual sensor of a first robotic device;

building a tag layer comprising identifications and locations of a plurality of tags placed in predetermined positions in the environment; and forming a multilayer map using the feature point cloud layer and the tag layer, wherein the feature point cloud layer and the tag layer share a same coordinate system.

In certain embodiments, the method further includes: constructing an occupancy map using scans captured by a first light detection and ranging (LIDAR) device; and incorporating the occupancy map into the multilayer map as an occupancy layer, such that the occupancy map layer, the feature point cloud layer and the tag layer has the same coordinate system.

In certain embodiments, the method further includes updating the multilayer map by:

capturing a current image by the first visual sensor;

extracting features from the current image;

matching the features extracted from the current image to features in an immediate previous key frame of the first robotic device, so as to obtain matched features;

recovering a current pose of the first robotic device based on the matched features;

updating the current pose of the first robotic device using measurement from a first inertial measurement unit (IMU) or a first wheel encoder mounted on the first robotic device to obtain updated current pose of the first robotic device;

detecting the tags from the current image;

computing poses of the tags based on the updated current pose of the first robotic device and location of the detected tags in the current image; and updating the multilayer map based on the updated current pose of the first robotic device and the poses of the tags.

In certain embodiments, the method further includes updating the multilayer map by: detecting loop closure by matching the detected tags to the tags recorded in the tag layer of the multilayer map; and further updating the updated current pose of the first robotic device using the detected loop closure.

In certain embodiments, the method further includes localizing a second robotic device by matching tags detected from second images of the environment captured by a second visual sensor of the second robotic device to locations of the tags in the multilayer map. Resolution of the second visual sensor is lower than resolution of the first visual sensor.

In certain embodiments, the method further includes: matching features detected in scans of a second light detection and ranging (LIDAR) device to features stored in the occupancy map layer.

In certain embodiments, the method further includes using the multilayer map by:

capturing a current localization image by the second visual sensor;

extracting features from the current localization image;

matching the features extracted from the current localization image to features in an immediate previous key frame of the second robotic device, so as to obtain matched features;

recovering a first current pose of the second robotic device based on the matched features;

detecting the tags from the current localization image;

computing a second current pose of the second robotic device based on the multilayer map and the detected tags; and updating pose of the second robotic device using the first current pose, the second current pose, and measurement from a second inertial measurement unit (IMU) or a second wheel encoder mounted on the second robotic device, to obtain updated current pose of the second robotic device.

In certain embodiments, the method further includes updating the updated current pose of the second robotic device by: detecting loop closure by matching the detected tags to the tags recoded in the tag layer of the multilayer map; and further updating the updated current pose of the second robotic device using the detected loop closure.

In certain aspects, the present invention relates to a non-transitory computer readable medium storing computer executable code. In certain embodiments, the computer executable code, when executed at a processor of a controller of a mapping device, is configured to perform the method described above.

In certain embodiments, the computer executable code, when executed at a processor of a controller of a first robotic device, is configured to:

construct a feature point cloud layer of an environment using first images captured by first visual sensor of the first robotic device;

build a tag layer comprising identifications of a plurality of tags and locations of the plurality of tags, wherein the tags are placed in predetermined positions in the environment; and form a multilayer map using the feature point cloud layer and the tag layer, wherein the feature point cloud layer and the tag layer share a same coordinate system.

In certain embodiments, the computer executable code is configured to:

capture a current image by the first visual sensor;

extract features from the current image;

match the features extracted from the current image to features in an immediate previous key frame of the first robotic device, so as to obtain matched features;

recover a current pose of the first robotic device based on the matched features;

update the current pose of the first robotic device using measurement from at least one of a first inertial measurement unit (IMU) and a first wheel encoder mounted on the first robotic device to obtain updated current pose of the first robotic device;

detect the tags from the current image;

compute poses of the tags based on the updated current pose of the first robotic device and location of the detected tags in the current image;

update the multilayer map based on the updated current pose of the first robotic device and the poses of the tags;

detect loop closure by matching the detected tags to the tags recorded in the tag layer of the multilayer map; and further updating the updated current pose of the first robotic device using the detected loop closure.

In certain embodiments, the computer executable code is configured to: localize a second robotic device by matching tags detected from second images of the environment captured by a second visual sensor of the second robotic device to locations of the tags in the multilayer map, wherein resolution of the second visual sensor is lower than resolution of the first visual sensor.

In certain embodiments, the computer executable code is configured to:

capture a current localization image by the second visual sensor;

extract features from the current localization image;

match the features extracted from the current localization image to features in an immediate previous key frame of the second robotic device, so as to obtain matched features;

recover a first current pose of the second robotic device based on the matched features;

detect the tags from the current localization image;

compute a second current pose of the second robotic device based on the multilayer map and the detected tags;

update pose of the second robotic device using the first current pose, the second current pose, and measurement from a second inertial measurement unit (IMU) or a second wheel encoder mounted on the second robotic device, to obtain updated current pose of the second robotic device;

detect loop closure by matching the detected tags to the tags recoded in the tag layer of the multilayer map; and further update the updated current pose of the second robotic device using the detected loop closure.

These and other aspects of the present invention will become apparent from the following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

Figure 1:
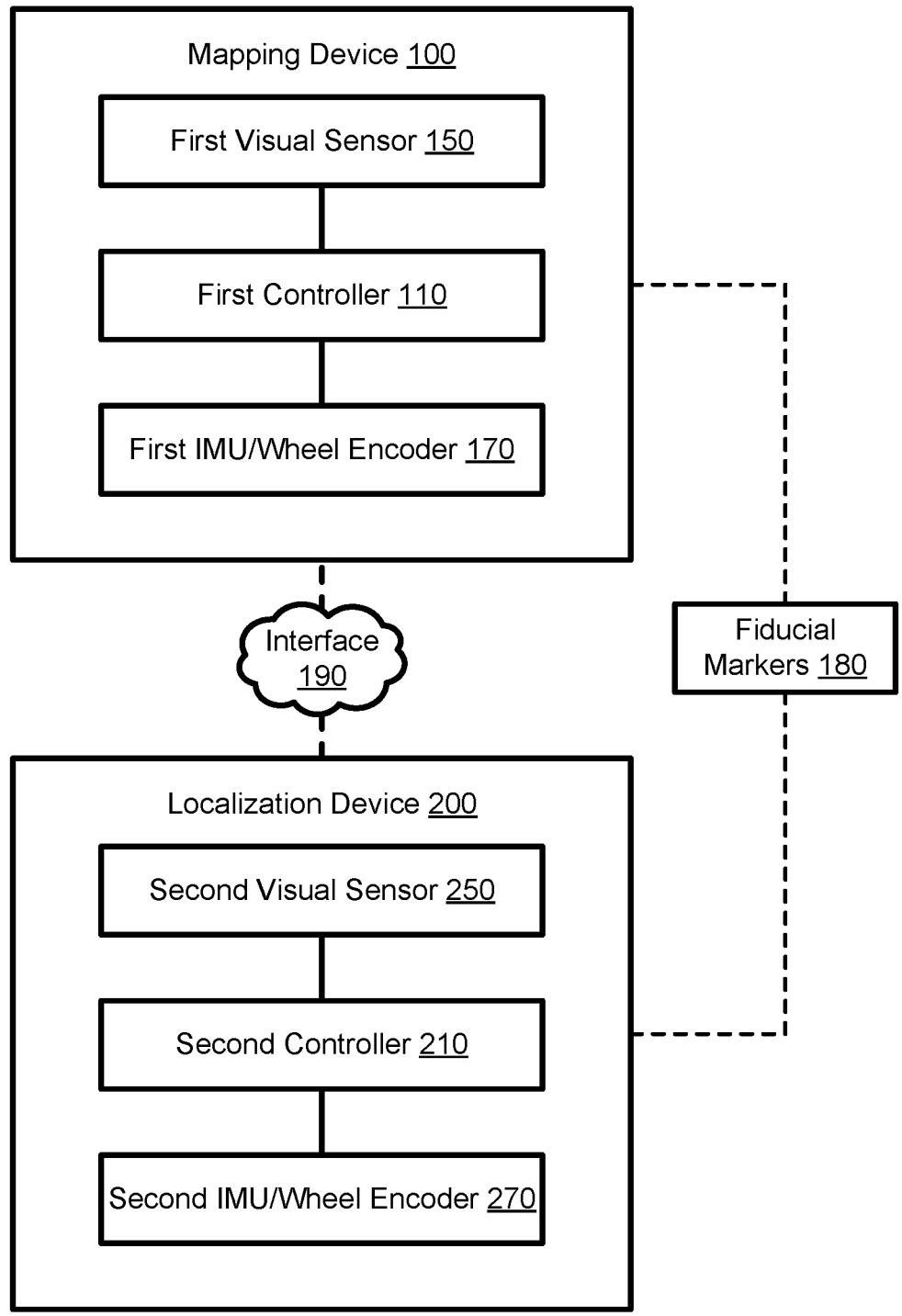
FIG. 1 schematically depicts a system for multimodal mapping and localization according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention may be implemented by computer systems. As depicted in the drawings, computer components may include physical hardware components and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In certain aspects, the present invention relates to a multimodal pose recovery and localization method. In certain embodiments, the method is performed in an indoor environment. In certain embodiments, the method includes fusing information from different types of sensors to form a hybrid map, and then realizing a fast and reliable way for pose recovery and localization based on the hybrid map. In addition, the pose and position could automatically converge with further motion.

In one example, a storage shelves environment is provided. The storage shelves have similar geometry and features. When LIDAR and VIO based localization methods are used in the environment, it's difficult to estimate the current robot position with instant measurement. In fact, the robot is likely to estimate a wrong location due to the similarity between different aisles, especially when the goods on the shelves are relocated frequently. In order to solve this problem, a method according to certain embodiments of the present invention is provided, which uses fixed landmarks to initial the robot position, and uses LIDAR/vision/internal sensor based method to refine the state estimation.

In certain embodiments, the robot is configured to estimates its pose and position using the distinguishable landmarks. Specifically, the robot may generate the initial pose/position estimation by checking a lookup table of landmark position. Then the robot uses this estimated pose and position to initialize VIO or laser scan for refining the initial pose/position. After the robot begins to move forward, one or more measurements (including wheel odometry, VIO, Lidar, Radar, GPS) would help the robot to converge the pose and position by filter-based or optimization-based fusion method. To achieve the purpose according to certain embodiments of the present invention, the following aspects are considered.

1. Hardware Requirements.

In certain embodiments, the present invention requires robot(s) equipped with multi sensors and a computing unit. The sensors may include one or more of camera, IMU/wheel/motor encoder, GPS, radar, and LIDAR/etc. In certain embodiments, all the sensors in the robot are synchronized and are intrinsic and extrinsic calibrated. In certain embodiments, an indoor environment is arranged with distinguishable markers, such as AprilTags or QR codes.

2. Pre-Mapping and Ground Truth Preparation.

In certain embodiments, the present invention performs pre-mapping and ground truth preparation using a robot with high quality or high-resolution sensors, so as to obtain a hybrid map-a global map overlapping with a distinguishable markers map. The hybrid map functions as a look-up table for localization performed later. On the one hand, LIDAR/Camera with high-resolution sensors, which are usually expensive, are used to generate a high-quality visual features/occupied map for global planning. On the other hand, distinguishable markers and robot position are recorded. The robot synchronizes the markers data with the robot pose, maps the markers data on top of the global map, and stores the markers data associated with their pose in global coordinate. After the robot finishes the high-quality hybrid map initialization or building, features and markers are stored and ready for processing. Filter-based or optimization-based method, such as bundle adjustment, is used to associate visual features and markers into the hybrid map. In addition, structure from motion method utilizes these data to reconstruct the whole environment and evaluate the quality of the hybrid map. This high-quality hybrid map is the ground truth in the following localization steps for robots with low cost sensors.

3. Localization.

In certain embodiments, when the marker-labeled and visual-features-labeled hybrid map is ready, robots with low cost navigation sensors (with cheaper LIDAR, without LIDAR, etc.) and modules uses the hybrid map for localization or navigation. The robots could quickly initialize their pose/position estimation by searching the current markers in the field of view from the markers' position lookup table. Using the current markers' ground truth positions, the robot poses were obtained by solving a simple Perspective-n-Point (PnP) problem. There were two main benefits of this method in the localization process:

(1). Since the makers' look-up table was a fairly small size dataset (generally one or two markers per frame) comparing with the global visual features map dataset (generally thousands of features per key frame), this method would be much faster for pose initialization.

(2). Since each marker was distinguishable with a fixed position while the visual features and laser scans were ambiguous and sensitive to a movable object, the state estimation is more reliable than the VIO initialization.

After obtaining a pose initialization, the robots then use it to initialize the VIO or the scan matching. A reliable initialization for visual SLAM and LIDAR SLAM reduces the complexity for solving robot's highly nonlinear pose iteration, helps it converge faster, and further improved the robot's reliability.

Along the robots' trajectory after initialization, more and more observations (laser/visual feature/markers) help the robots converge their predictions into the ground truth map. The good initialization (fixed markers) helped the robots filter out the outlier measurements, and further correct the robots state estimation along the way.

4. Close Loop

After the robots navigate in an unknown environment and revisit known map, a bundle adjustment process/close loop process is used to correct its trajectory and refine the map for the unknown environment. Usually, a costly process is used by randomly searching for matching features. In contrast, in certain embodiments of the present invention, the robots take very limited random search. Actually, the robots use distinguishable markers as fixed landmarks to trigger close loop process. After close loop checking is triggered by fixed marker, feature match, or wheel odometry/laser scan, the robots would start checking the close loop evaluation by feature match (and laser scan). With this innovation, robots significantly reduced the false-linked close loop cases.

5. Further Extension for Outdoor

For outdoor use, fewer fixed markers may be used, specifically for the robots' departure points. With this setup, the robots made reliable corrections their state estimation each time when they pass by the departure area. In certain embodiments, this innovation is very useful for package delivery missions which requires frequently looping back to package storage location. This marker guides the robots to navigate home and to make better close loop detection for mapping and outdoor navigation.

In summary, certain embodiments of the present invention discloses a fusion robot navigation system using multimodal based sensors. The innovation includes but is not limited to: (1) ground truth map and data fusion development; (2) fast localization for pose estimation; (3) fast and reliable close loop detection; (4) extension for departure point navigation. This innovation would speed up the pose initialization, reduce the computation load, improve the state estimation accuracy; and (5) freedom for selecting different low-cost sensors for robots' navigation after mapping.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In certain aspect of the present invention, a system for multimodal mapping and localization is provided. In certain embodiments, as shown in FIG. 1, a multimodal mapping and localization system 10 includes a mapping device 100, and one or more localization devices 200, a plurality of fiducial markers 180 fixed in an environment where the fiducial markers 180 are recognizable by the mapping device 100 and the localization devices 200, and an interface 190 for communicating the mapping device 100 with the localization devices 200. Each of the mapping device 100 and the localization devices 200 may be a ground robotic device, an augmented reality/virtual reality (AR/VR) device, a 3D reconstruction device, or an unmanned aerial vehicle (UAV) etc. The mapping device 100 includes a first controller 110, a first visual sensor 150, and a first IMU/Wheel encoder 170. The first visual sensor 150 and the first IMU/Wheel encoder 170 are high quality and high-resolution devices, and the first robotic device 100 is configured to use the first visual sensor 150 and the first IMU/Wheel encoder 170 to construct a high resolution, multimodal map of the environment. The multimodal map is also called a multilayer map or a hybrid map in certain embodiments of the present invention. The fiducial markers 180 are objects placed in the field of view of the environment for use as reference or measure. The density of the fiducial markers 180 and locations of the fiducial markers 180 in the environment are predetermined based on the method and device used to detect the fiducial markers 180, the sensitivity of detecting the fiducial markers 180, the viewing field of the mapping device 100 and the localization devices 200, the complexity of the environment, etc. In certain embodiments, the fiducial markers 180 include AprilTags, Quick Response (QR) code, Universal Product Code (UPC), and other type of tags that are easily recognizable from camera images or laser scans. The interface 190 is configured to transmit the multimodal map prepared by the mapping device 100 to the localization devices 200. The interface 190 may be a wireless or wired network, a USB interface, or any other types of interfaces to communicatively connect the mapping device 100 and the localization devices 200. In certain embodiments, there is no direct communication between the mapping device 100 and the localization devices 200, and localization devices 200 receive the multimodal map from the mapping device 100 via a media independent from the mapping device 100 and the localization device 200. Each of the localization devices 200 includes a second controller 210, a second visual sensor 250, and a second IMU/Wheel encoder 270. The quality and resolution of the second visual sensor 250 and the second IMU/Wheel encoder 270 are lower than that of the first visual sensor 150 and the first IMU/Wheel encoder 170. Each localization device 200 is configured to use the second visual sensor 250, the second IMU/Wheel encoder 270 and the multimodal map to localize itself efficiently.

Figure 2:
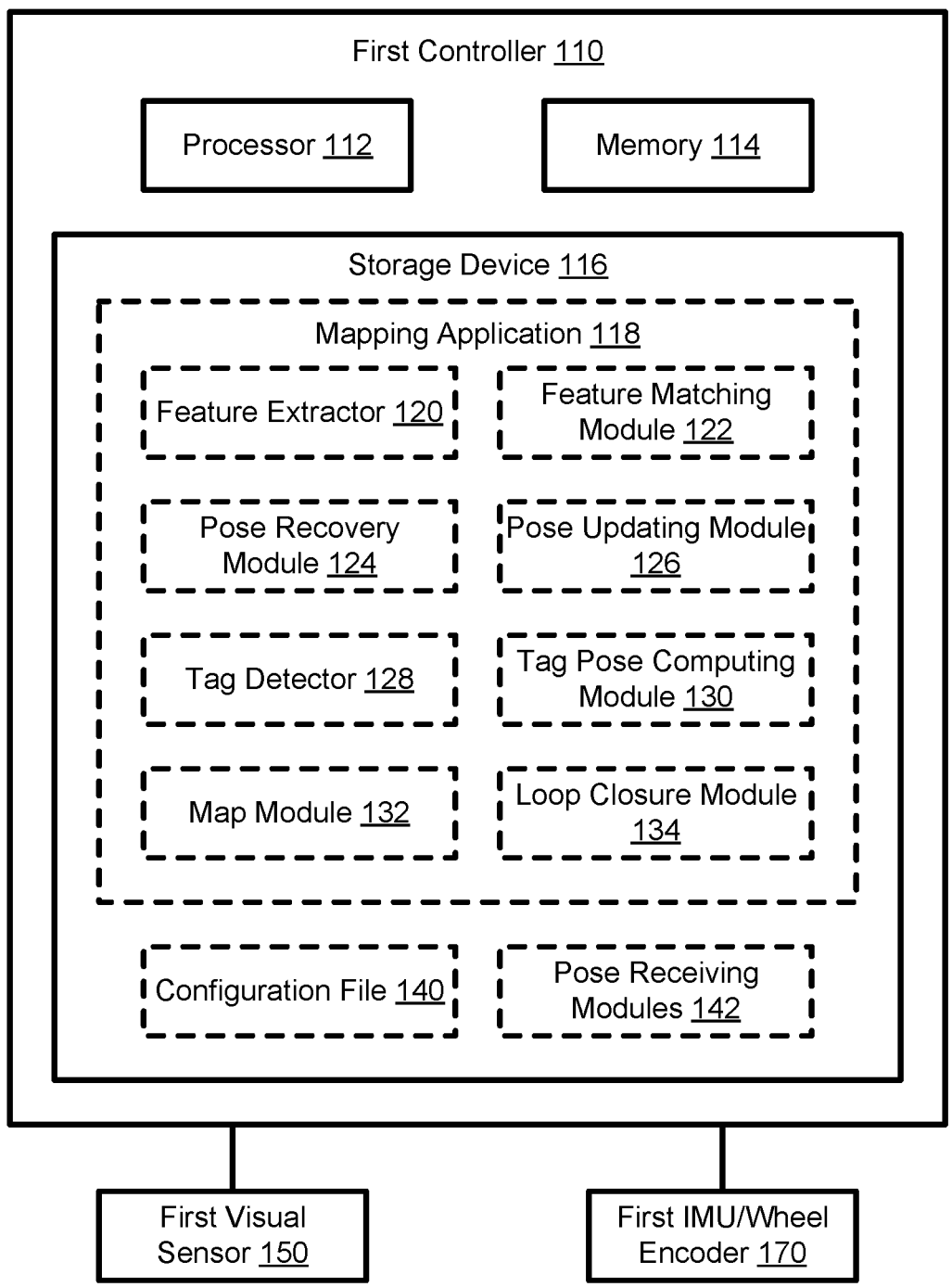
FIG. 2 schematically depicts a multimodal mapping device according to certain embodiments of the present invention.

FIG. 2 schematically shows a multimodal mapping device according to certain embodiments of the present invention. As shown in FIG. 2, the mapping device 100 includes the first controller 110, the first visual sensor 150 and the first IMU/Wheel encoder 170. In certain embodiments, the first visual sensor 150 includes a camera or other visual sensors, and is configured to capture images or videos of the environment. In certain embodiments, the first visual sensor 150 may further include a LIDAR. The first IMU/Wheel encoder 170 may include one or more IMUs, or one or more wheel encoders, or both the IMU and the wheel encoders. The IMUs are inertial sensors, such as accelerometers, gyroscopes and magnetometers, which are configured to perform inertial measurement of the mapping device 100; the wheel encoder is configured to measure distance traveled by the mapping device 100. When the IMU(s) or/and wheel encoder(s) 170 are in high quality, they are configured to measure the traveling distance of the mapping device accurately from one time point to the next time point. The accurate measurement of the traveling distance of the mapping device 100 helps the determination the pose of the mapping device 100. In certain embodiments, the mapping device 100 may include other necessary components. Exemplary other components may include an interactive interface for communicating with other devices, such as a wireless connection with a central computer.

In certain embodiments, the first controller 110 may be a computing device, which includes a processor 112, a memory 114, and a storage device 116 storing computer executable code. The computer executable code includes a mapping application 118, configuration file 140, one or more pose receiving modules 142, and optionally other applications such as an operating system. The processor 112 controls operation of the first controller 110. In certain embodiments, the processor 112 may be a central processing unit (CPU). The memory 114 may be a volatile memory, such as the random-access memory (RAM), for storing the data and information during the operation of the first controller 110. In certain embodiments, the memory 114 may be a volatile memory array. In certain embodiments, the first controller 110 may run on more than one processor 112 and/or more than one memory 114. The storage device 116 is a non-volatile data storage media or device for storing the mapping application 118 of the first controller 110. Examples of the storage device 116 may include flash memory, memory cards, USB drives, or other types of non-volatile storage devices such as hard drives, floppy disks, optical drives, or any other types of data storage devices. In certain embodiments, the first controller 110 may have more than one storage device 116. In certain embodiments, the first control 110 may also include a remote storage device 116. The mapping application 118 include the code or instructions which, when executed at the processor 112, may perform certain features to control the operation of the first robotic device 100. In certain embodiments, the mapping application 118 is configured to perform simultaneous localization and mapping (SLAM) of the mapping device 100, and may also be named the SLAM application. The configuration file 140 includes calibration parameters of the first visual sensor 150. The pose receiving modules 142 are configured to, upon receiving current pose of the mapping device 100 from the mapping application 118, control the operation of the mapping device 100 based on its current pose in real time.

In certain embodiments, as shown in FIG. 2, the mapping application 118 includes, among other things, a feature extractor 120, a feature matching module 122, a pose recovery module 124, a pose updating module 126, a tag detector 128, a tag pose computing module 130, a map module 132, and a loop closure module 134.

The feature extractor 120 is configured to receive or retrieve intrinsic calibration parameters of the first visual sensor 150 from the configuration file 140, and receive or retrieve images taken by the first visual sensor 150. In certain embodiments, the first visual sensor 150 is a color camera, and the images are RGB images. In certain embodiments, the first visual sensor 150 is a black and white camera, and the images are grayscale images. In certain embodiments, the feature extractor 120 convert the current RGB image to grayscale image before performing feature extraction. In certain embodiments, the intrinsic parameters include camera center, distortion correction, and focus length, and the feature extractor 120 pre-processes the current image before performing the feature extraction. After receiving the intrinsic calibration parameters of the first visual sensor 150 and a current image captured by the first visual sensor 150, the feature extractor 120 is configured to extract features from the current image, that is, detect features in the current image and calculate a descriptor to define each of the features. In certain embodiments, the feature extraction may be performed using Harris, Scale Invariant Feature Transform (SIFT), Speeded-Up Robust Features (SURF), Features from Accelerated Segment Test (FAST), etc. The features are interesting part of the images and may include, among other things, edge, corner, blobs, ridges. After the features are detected, the feature extractor 120 describes the detected features based on the neighboring pixels around each feature point. The descriptor of the feature point may be a vector descriptor or a binary descriptor. The vector descriptor is a feature vector with n dimensions, for instance n=128 for SIFT features. It stores more information, but it is difficult to find the nearest match in high dimensional space. The binary vector is a n-bit binary string consisting of 0 and 1. It can be processed quite fast with efficient algorithms. In certain embodiments, the feature points are defined by both feature descriptors and their pixel locations in the camera images. An exemplary feature point in the current image may be defined by (u, v, descriptor), where u and v are coordinates of the feature point in the current image, and the descriptor is the calculated vector of the feature point. In certain embodiments, the first visual sensor 150 further includes a LIDAR, and the feature extractor 120 is configured to receive laser scans from the LIDAR. Upon receiving the current LIDAR scan, the feature extractor 120 detects features, such as lines, corners, and optionally curved or circular shape from the current laser scan. After the features are detected, the corresponding feature points in the current laser scan are recorded using descriptors. In certain embodiments, each of the feature points in the current laser scan is defined by (direction, range), where direction indicates the direction of the object relative to LIDAR, and the range is the distance between the LIDAR and the object. After detection and description of the feature points, the feature extractor 120 is configured to send the information to the feature matching module 122.

The feature matching module 122 is configured to match each of the feature points in the current image to the feature points in the immediate previous key frame (or key image) based on the descriptors. In certain embodiments, other previous images may act as reference frame instead of the previous key frame. For vector feature descriptors such as SIFT, principal components analysis-SIFT (PCA-SIFT), Harris-SIFT and SURF, the vector descriptor matching may be performed by exhaustive search or an approximate algorithm. For binary vector descriptors such as binary robust independent elementary features (BRIEF), oriented FAST and rotated BRIEF (ORB) and binary robust invariant scalable keypoints (BRISK), the binary descriptor matching may be performed by looking for the descriptors with the smallest Hamming distance, and the number of bits different in the two descriptors measures their dissimilarity. In certain embodiments, for the LIDAR scan, the feature matching module 122 is further configured to match LIDAR features in the current laser scan with one or more previous laser scans. The matching information thus includes matched image feature points in the camera image (u, v), and optionally matched scan feature in the robot frame (direction, range). In certain embodiments, the feature matching module 122 is further configured to match LIDAR features with image feature points via extrinsic parameter. The extrinsic parameters include the orientation and location of different sensors mounted on the robot. After the matching process, the feature matching module 122 is configured to send the matching result to the pose recovery module 124.

The pose recovery module 124 is configured to, upon receiving the feature matching result from the feature matching module 122 and the extrinsic calibration parameters from the configuration file 140, calculate the relative rotation and translation between current robot pose and last robot pose measurement, and calculate the feature descriptor location in the global frame. After calculation, the pose of the mapping device 100 is defined as (x, y, yaw) in the global frame, where x, y are the coordinates of the mapping device 100 in the 3D map coordinate system; and each feature point is defined as (x, y, z, descriptor) instead of (u, v, descriptor), where the x, y, z are the coordinates of the feature point in the 3D map coordinate system and u, v are coordinates of the feature point in the current 2D image coordinate system. However, those calculated pose of the mapping device 100 and the feature point location of the current image are not added to the 3D map yet. The pose recovery module 124 then sends the pose of the mapping device 100 in the global frame (x, y, yaw) and the feature descriptor location in the global frame (x, y, z, descriptor) to the pose updating module 126 and the loop closure module 134. In certain embodiments, when LIDAR is available, the pose recovery module 124 also sends the matched LIDAR features received form the feature matching module 122 to the pose updating module 126.

The pose updating module 126 is configured to, upon receiving the pose of the mapping device in the global frame (x, y, yaw) and the feature descriptor location (x, y, z, descriptor) from the pose recovery module 124, and relative pose change in mapping device frame or namely the robot frame ($\Delta x$, $\Delta y$, $\Delta yaw$) from the first IMU/wheel encoder 170, use the pose of the mapping device and the relative pose change to update current pose of the mapping device 100, and update the location of the matched features, so as to obtain updated current pose of the mapping device 100 and updated matched feature points. In certain embodiments, the pose update includes filter to compute optimized pose of the mapping device 100. The relative pose change from the first IMU/wheel encoder 170 normally is more accurate and is highly weighted in the calculation. In certain embodiments, the pose updating module 126 further receives loop closure information from the loop closure module 134 when the loop closure information is available, and uses the loop closure information to update the current pose of the mapping device 100. When the updated current pose is available, the pose updating module 126 is configured to output the updated current robot pose (x, y, yaw) to other modules of the mapping device 100 for their use, such as controlling of the mapping device 100. Further, the pose updating module 126 is configured to send the updated current robot pose (x, y, yaw) and updated current feature points (x, y, z, descriptor) to the tag pose computing module 130. In certain embodiments, when LIDAR is available, the pose updating module 126 also sends the matched LIDAR features received form the pose recovery module 124 to the tag detector 128.

The tag detector 128 is configured to recognize the fiducial markers 180 from the current image captured by the first visual sensor 150. The fiducial markers 180 may be AprilTag or QR, which are easily detectable. In certain embodiments, the detected tag is defined as (u, v, tag_ID) in the current image, where x, y are coordinates of the tag in the current image, and the tag_ID is the specific identification of the tag among the set of tags used in the environment. In certain embodiments, the location of a tag (u, v) may correspond to a specific corner or the center of the tag. In certain embodiments, the tag may include four set of (u, v) coordinates to define the location of the tag, where each of the four set of (u, v) corresponds to the coordinates of one corner of the tag in the current image. For example, an AprilTag may be defined as ($u_1$, $v_1$, $v_2$, $u_3$, $v_3$, $u_4$, $v_4$, 21), where ($u_1$, $v_1$), ($u_2$, $v_2$), ($u_3$, $v_3$), ($u_4$, $v_4$), are respectively coordinates of the top left corner, top right corner, bottom left corner, bottom right corner of the AprilTag in the current image, and "21" is the 21st of the set of AprilTag. After detection of the fiducial markers 180, the tag detector 128 sends the result to the tag pose computing module 130.

The tag pose computing module 130, after receiving the tag location and identification (u, v, tag_ID) in the current image from the tag detector 128, the updated current pose of the mapping device 100 in the global frame (x, y, yaw) and the updated current feature points characterization (x, y, z, descriptor) in the global frame from the pose updating module 126, and the extrinsic calibration parameters of the first visual sensor 150, is configured to use the extrinsic calibration parameters and the tag location and identification to optimize the location of the fiducial markers 180, so as to obtain current pose of the tag in the global frame (x, y, z, tag_ID), where x, y, z are coordinates of the tag in the global frame. The tag pose computing module 130 is further configured to send the updated current pose of the mapping device 100 in the global frame (x, y, yaw), the updated current characterization of the feature points in the global frame (x, y, z, descriptor), and current pose of the tag in the global frame (x, y, z, tag_ID) to the map module 132. Kindly note x, y, z for the mapping device 100, the feature points and the tag(s) are their corresponding location in the global frame and are different from each other. In certain embodiments, when LIDAR is available, the tag pose computing module 130 also sends the matched LIDAR features received form the pose updating module 126 to the map module 132.

The map module 132 is configured to, upon receiving the updated current pose of the mapping device 100 in the global frame (x, y, yaw), the updated current characterization of the feature points in the global frame (x, y, z, descriptor), and the current pose of the tag in the global frame (x, y, z, tag_ID), use the information to update the 3D map. In certain embodiments, when LIDAR is available, the map module 132 also update the 3D multimodal map (occupancy map layer) using the matched LIDAR features received form the tag pose computing module 130.

In certain embodiments, the updated, matched feature points in the current image is obtained by the pose updating module 126, sent to the tag pose computing module 130, and then sent to the map module 132 to update the 3D multimodal map. In other embodiments, the updated current feature points, after being obtained by the pose updating module 126, is sent directly from the pose updating module 126 to the map module 132 to update the 3D multimodal map. In certain embodiments, the updated current pose of the mapping device 100 is generated by the pose updating module 126, sent to the tag pose computing module 130, and then sent to the map module 132 to update the 3D multimodal map. In other embodiments, the updated current pose of the mapping device 100, after being generated by the pose updating module 126, is sent directly from the pose updating module 126 to the map module 132 to update the 3D multimodal map. In certain embodiments, the matched LIDAR features calculated by the feature matching module 122 is sent to the pose recovery module 124, and then sequentially sent through the pose updating module 126 (here the LIDAR data is mapped from the local frame to the global frame, that is, from the parameters of direction, range to the coordinates in the 3D coordinate system) and the tag pose computing module 130 to the map module 132 to update the 3D multimodal map. In other embodiments, the matched LIDAT features, after being generated by the feature matching module 122, is sent directly from the feature matching module 122 to the map module 132 to update the 3D multimodal map.

Figures 3, 4:
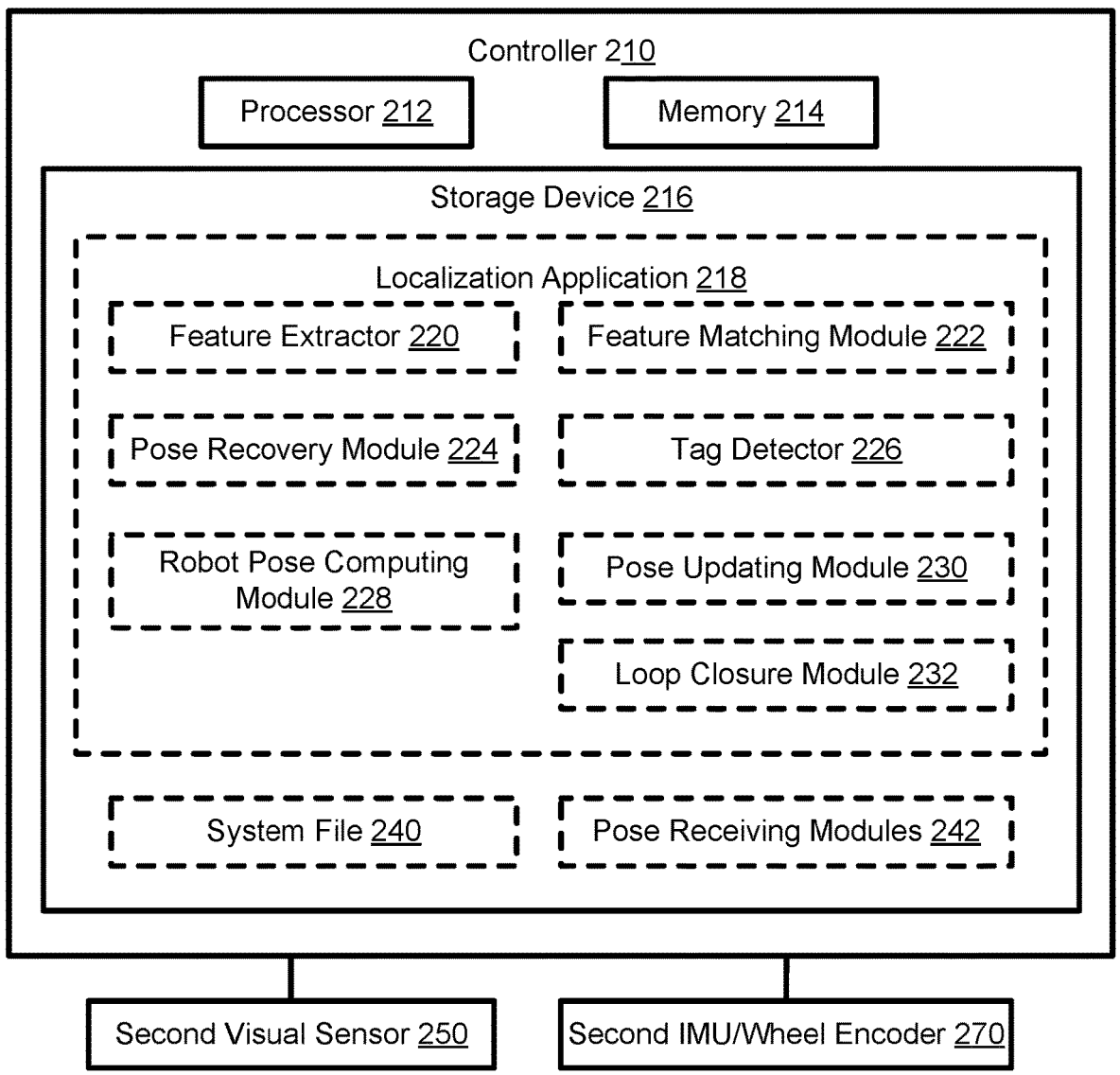
FIG. 3 schematically depicts a multimodal map according to certain embodiments of the present invention.
FIG. 4 schematically depicts a localization device according to certain embodiments of the present invention.

FIG. 3 schematically depicts a multimodal or hybrid map according to certain embodiments of the present invention. As shown in FIG. 3, a 3D multimodal map 300 includes three layers, the three layers are respectively a tag layer 302, a visual feature layer 304, and a LIDAR Map layer 306. The feature points in the visual feature 304 are defined by (x, y, z, descriptor), and key frames may also be stored in the visual feature layer 304, together with the pose of the mapping device corresponding to each key frame. The LIDAR map layer 306 is a high resolution occupied map. The tags in the tag layer 302 are defined by (x, y, z, tag_ID), and overlays on top of the high resolution visual feature layer 304 and the LIDAR map layer 306. The three layers of the 3D multimodal map 300 are associated with each other through the three-dimensional coordinates along the x, y, and z directions, where x, y, z may be correspondingly left-right direction, front-back direction, and up-down direction.

In certain embodiments, when the map application 118 is initialized, and there is no map available yet, the map module 132 is configured to construct a 3D map based on the first few captured images or frames. Basically, the first visual sensor 150 captures a plurality of images (at least two), the feature extractor 120 extract feature points from the capture images, the feature matching module 122 matches the feature points from the different images, and the map module 132, based on the matched feature points, constructs an initial 3D map based on the matched feature points. In certain embodiments, the pose of the mapping device 100 and the tag information detected from the images can also be added to the 3D map to form a 3D multimodal map, where the 3D multimodal map includes layers of information that are associated with each other because the feature points, the pose of the mapping device 100, and the location of the tags share the same coordinate system.

The loop closure module 134 is configured to, upon receiving the 3D multimodal map from the map module 132, and/or the recovered pose of the mapping device 100 from the pose recovery module 124, detect previously visited location in the environment. In certain embodiments, the loop closure detection is performed by matching the newly obtained features with the features in the map. The detected loop closure is send to the pose updating module 126 for updating the pose of the mapping device 100 and locations of the featured points, and subsequently to update the 3D multimodal map. In certain embodiments, the process of the current frame by the feature extractor 120, the feature matching module 122, the pose recovery module 124, the pose updating module 126, the tag pose computing module 130 and the map module 132 are sequentially, and the process of the current frame by the tag detector 128 and the tag pose computing module 130 are sequentially. In contrast, the loop closure module 134 may operate as a thread somewhat independent from the above sequential steps, and continuously receives input from the pose recovery module 124, the map module 132, and outputs to the pose updating module 126.

The configuration file 140 stores intrinsic and extrinsic calibration parameter of the first visual sensor 150. When the first visual sensor 150 is a camera, the intrinsic parameters may include optical center, lens distortion, and focal length of the camera, and the extrinsic parameters may include mounting position and orientation of the first visual sensor 150 relative to the main body of the mapping device 100, which may be defined as the camera's (x, y, z, roll, yaw, pitch) relative to the mapping device 100.

The pose receiving modules 142 are other modules of the mapping device 100 that require poses of the mapping device 100, and the poses receiving modules 142 is configured to either receive or retrieve the poses from the pose updating module 126.

After the high-resolution 3D multimodal map is prepared by the mapping device 100, one or more of the localization devices 200 can use the high-resolution 3D multimodal map to guide the localization devices 200.

FIG. 4 schematically depicts a localization device according to certain embodiments of the present invention. As shown in FIG. 4, the localization device 200 includes the second controller 210, the second visual sensor 250 and the second IMU/Wheel encoder 270. The second visual sensor 250 includes a camera or other visual sensors, and is configured to capture images or videos of the environment. In certain embodiments, the second visual sensor 250 may further include a LIDAR. The second IMU/Wheel encoder 270 may include one or more IMUs, or one or more wheel encoders, or both the IMU and the wheel encoder. The IMUs are inertial sensors, such as accelerometers, gyroscopes and magnetometers, which are configured to perform inertial measurement of the localization device 200; the wheel encoder is configured to measure distance traveled by the localization device 200. The resolution or accuracy of the second visual sensor 250 and the second IMU/wheel encoder 270 is lower than the resolution or accuracy of the first visual sensor 150 and the first IMU/wheel encoder 170. In other words, low cost hardware may be used in the localization device 200. In certain embodiments, the localization device 200 may include other necessary components. Exemplary other components may include an interactive interface for communicating with other devices, such as a wireless connection with a central computer.

In certain embodiments, the second controller 210 may be a computing device the same as or similar to the first controller 110. The computing device 210 includes a processor 212, a memory 214, and a storage device 216 storing computer executable code. The computer executable code includes a localization application 218, system file 240, one or more pose receiving modules 242, and optionally other applications such as an operating system. The processor 212 controls operation of the second controller 210. In certain embodiments, the processor 212 may be a central processing unit (CPU). The memory 214 may be a volatile memory, such as the random-access memory (RAM), for storing the data and information during the operation of the second controller 210. In certain embodiments, the memory 214 may be a volatile memory array. In certain embodiments, the second controller 210 may run on more than one processor 212 and/or more than one memory 214. The storage device 216 is a non-volatile data storage media or device for storing the localization application 218 of the second controller 210. Examples of the storage device 216 may include flash memory, memory cards, USB drives, or other types of non-volatile storage devices such as hard drives, floppy disks, optical drives, or any other types of data storage devices. In certain embodiments, the second controller 210 may have more than one storage device 216. In certain embodiments, the second control 210 may also include a remote storage device 216. The localization application 218 include the code or instructions which, when executed at the processor 212, may perform certain features to control the operation of the second robotic device 200. The system file 240 includes calibration parameters of the second visual sensor 250 and the 3D multimodal map prepared by the mapping device 100. The pose receiving modules 242 are configured to, upon receiving current pose of the localization device 200 from the localization application 218, control the operation of the localization device 200 based on its current pose in real time.

In certain embodiments, as shown in FIG. 4, the localization application 218 includes, among other things, a feature extractor 220, a feature matching module 222, a pose recovery module 224, a tag detector 226, a robot pose computing module 228, a pose updating module 230, and a loop closure module 232. The feature extractor 220, the feature matching module 222, the pose recovery module 224, the tag detector 226, the pose updating module 230, and the loop closure module 232 may have the same or similar function as the corresponding modules in the mapping application 118, and the difference may include: the data input of the localization application 218 has a lower resolution or accuracy than the data input of the mapping application 118; the mapping application 118 is configured to construct the high-resolution 3D multimodal map and continuously update the 3D multimodal map during the operation of the mapping device 100, while the localization application 218 is configured to use the high-resolution 3D multimodal to optimize the localization of the localization device 200 and basically don't update the high-resolution 3D multimodal map.

The feature extractor 220 is substantially the same as the feature extractor 120. The feature extractor 220 is configured to receive or retrieve intrinsic calibration parameters of the second visual sensor 250 from the system file 240, and receive or retrieve images taken by the second visual sensor 250. In certain embodiments, the second visual sensor 250 is a color camera, and the images are RGB images. In certain embodiments, the second visual sensor 250 is a black and white camera, and the images are grayscale images. In certain embodiments, the feature extractor 120 convert the current RGB image to grayscale image before performing feature extraction. In certain embodiments, the intrinsic parameters include camera center, distortion correction, and focus length, and the feature extractor 220 pre-processes the current image before performing the feature extraction. After receiving the intrinsic calibration parameters of the second visual sensor 250 and a current image captured by the second visual sensor 250, the feature extractor 220 is configured to extract features from the current images, that is, detect features in the current image and calculate a descriptor to define each of the features. An exemplary feature point in the current image may be defined by (u, v, descriptor), where u and v are coordinates of the feature point in the current image, and the descriptor is the calculated vector of the feature point. In certain embodiments, the second visual sensor 250 further includes a LIDAR, and the feature extractor 220 is configured to receive laser scans from the LIDAR. Upon receiving the current LIDAR scan, the feature extractor 220 detects features, such as lines, corners, and optionally curved or circular shape from the current laser scan. After the features are detected, the corresponding feature points in the current laser scan are recorded using descriptors. In certain embodiments, each of the feature points in the current laser scan is defined by (direction, range), wherein direction indicates the direction of the LIDAR relative to the coordinate system of the environment, and the range is the distance between the LIDAR and the object. After detection and description of the feature points, the feature extractor 220 is configured to send the information to the feature matching module 222.

The feature matching module 222 is substantially the same as the feature matching module 122. The feature matching module 222 is configured to match each of the feature points in the current image to the feature points in the immediate previous key frame (or key image) based on the descriptors. In certain embodiments, for the LIDAR scan, the feature matching module 222 is further configured to match LIDAR features in the current laser scan with one or more previous laser scans. The matching information thus includes matched image features in the camera image (u, v), and optionally matched scan feature in the robot frame (direction, range). After the matching process, the feature matching module 222 is configured to send the matching result to the pose recovery module 224.

The pose recovery module 224 is substantially the same as the pose recovery module 124. The pose recovery module 224 is configured to, upon receiving the feature matching result from the feature matching module 222 and the extrinsic calibration parameters from the system file 240, calculate the current rotation and translation of the localization device 200, and calculate the feature descriptor location in the global frame. After calculation, the pose of the localization device 200 is defined as (x, y, yaw) in the global frame, where x, y are the coordinates of the localization device 200 in the 3D map coordinate system; and each feature point is defined as (x, y, z, descriptor) instead of (u, v, descriptor), where the x, y, z are the coordinates of the feature point in the 3D map coordinate system and u, v, are coordinates of the feature point in the current 2D image coordinate system. However, those calculated pose of the localization device 200 and the feature point location of the current image would not be added to the 3D map. The pose recovery module 224 then sends the pose of the localization device 200 in the global frame (x, y, yaw) and the feature descriptor location in the global frame (x, y, z, descriptor) to the pose updating module 230 and the loop closure module 232. In certain embodiments, when LIDAR is available, the pose recovery module 224 also sends the matched LIDAR features received form the feature matching module 222 to the pose updating module 230.

The tag detector 226 is configured to recognize the fiducial markers 180 from the current image captured by the second visual sensor 250. The fiducial markers 180 may be AprilTag or QR, which are easily detectable. In certain embodiments, the detected tag is defined as (u, v, tag_ID) in the current images, where x, y are coordinates of the tag in the current image, and the tag_ID is the specific identification of the tag among the set of tags used in the environment. In certain embodiments, the location of a tag (u, v) may correspond to a specific corner or the center of the tag. In certain embodiments, the tag may include four set of (u, v) coordinates to define the location of the tag, where each of the four set of (u, v) corresponds to the coordinates of one corner of the tag in the current image. For example, an AprilTag may be defined as $(u_1, v_1, u_2, v_2, u_3, v_3, u_4, v_4, 21)$, where $(u_1, v_1)$, $(u_2, v_2)$, $(u_3, v_3)$, $(u_4, v_4)$, are respectively coordinates of the top left corner, top right corner, bottom left corner, bottom right corner of the AprilTag in the current image, and "21" is the 21st of the set of AprilTag. After detection of the fiducial markers 180, the tag detector 226 sends the result to the robot pose computing module 228.

The robot pose computing module 228, after receiving the tag characterization (u, v, tag_ID) in the current camera frame from the tag detector 226, and the tag characterization (x, y, z, tag_ID) in the global frame (3D multimodal map)

and the camera pose in the robot frame (x, y, z, roll, yaw, pitch) from the system file 240, is configured to use the data to optimize the robot pose in the global frame (x, y, yaw). Here the tag characterization (x, y, z, tag_ID) is the coordinate of the specific tag in the 3D multimodal map and the identification of the specific tag, and the information are retrieved from the 3D multimodal map stored in the system file 240; and the camera pose in the robot frame (x, y, z, roll, yaw, pitch) means the relative mounting location and orientation of the visual sensor 250 on the localization device 200. After obtaining the current pose of the localization device 200, the robot pose computing module 228 is further configured to send the information to the pose update module 230.

The pose updating module 230 is configured to, upon receiving the current pose of the localization device 200 in the global frame (x, y, yaw) and the feature descriptor location (x, y, z, descriptor) from the pose recovery module 224, relative pose change in localization device frame or namely relative change in the robot frame ($\Delta x$, $\Delta y$, $\Delta yaw$) from the second IMU/wheel encoder 270, the current pose of the localization device 200 in the global frame (x, y, yaw), and loop closure information from the loop closure module 232 when it's available, and use the information to update poses of the localization device 200. The current pose of the localization device 200 received from the pose recovery module 224 is calculated based on the features in the current image and optionally LIDAR features in the current laser scan, and the current pose of the localization device 200 received from the robot pose computing module 228 is calculated based on the tags in the current image, and the calculation of the later is normally more accurate than the former. The pose updating module 230 is configured to calculate the current pose of the localization device 200 based on four variances in the measurement of: (1) relative change in the robot frame ($\Delta x$, $\Delta y$, $\Delta yaw$) from the second IMU/wheel encoder 270; (2) tag characterization in the 3D multimodal map; (3) feature point characterization in the 3D multimodal map; and (4) the feature points in the current LIDAR scan. Here variance is a measurement of the reliability of the measurement. The higher the variance, the less reliable the measurement. The relative change in the robot frame has low variance (more weight) on pose estimation because it is normally more accurate than the estimation though the images; the tag characterization has low variance (more weight) on pose estimation because it is normally more accurate than the estimation through the images. By minimizing the sum of residuals (the residuals are given by the re-projection error multiple with inverse variance) in the optimization function, the pose updating module 230 is configured to get the optimized result.

When the updated current pose of the localization device 200 is available, the pose updating module 230 is configured to output the current localization device 200 pose (x, y, yaw) to other modules of the localization device 200 for their respective use, such as control of the localization device 200.

The loop closure module 232 is configured to, upon receiving the poses of the mapping device in the 3D multimodal map and feature descriptor ground truth locations in the 3D multimodal map (x, y, z, descriptor) from the system file 240, the current pose of the localization device 200 in the global frame (x, y, yaw) and feature descriptor locations in the global frame (x, y, z, descriptor) from the pose recovery module 224, and when available, the updated pose of the localization device 200 in the global frame (x, y, yaw) and updated feature descriptor location in the global frame (x, y, z, descriptor) from the loop closure module 232, detect previously visited location in the environment. In certain embodiments, when the loop closure module 232 determines that a detected fiducial marker 180 from the current image matches a fiducial marker in the 3D multimodal map. Specifically, each fiducial tag has a unique ID, thus the fiducial tag is immediately matched if the robot observed the fiducial tag previously. If the robot sees a tag that it saw before, it immediately knows there must be a loop closure happened and need to compute at this point. And after loop closure, all the poses are optimized in some degree, include the tag pose. In other words, the matching of the fiducial tag triggers the loop closure operation by the loop closure module 232. Because the characterization of the fiducial marker is more accurate that the extracted features from the current frame, the loop closure module 232 puts more weight on the match of the fiducial marker 180 than on the matched features. After loop closure detection, the loop closure module 232 sends the detected loop closure to the pose updating module 230 for updating the pose of the localization device 200 and the feature descriptor location in the global frame. Here the 3D multimodal map is the high-resolution 3D map prepared by the mapping device 100, and the global frame means the coordinate system of the 3D map, thus 3D multimodal and the global frame may be used interchangeably under certain circumstances. However, a feature point or robot pose in the global frame, which have the coordinate system the same as the one in the 3D multimodal map, may not be really stored in the 3D multimodal map.

The system file 240 stores intrinsic calibration parameter of the second visual sensor 250, and the 3D hybrid map from the first robotic device 100. When the second visual sensor 250 is a camera, the parameters may include optical center, lens distortion, and focal length of the camera. In certain embodiments, the configuration file 240 may also stores extrinsic calibration parameters of the second visual sensor 250.

The pose receiving modules 242 are other modules of the second robotic device 210 that require poses of the second visual sensor 250 or the second robotic device 200, and the poses receiving modules 242 is configured to receive or retrieve the poses from the pose updating module 230.

Figure 5:
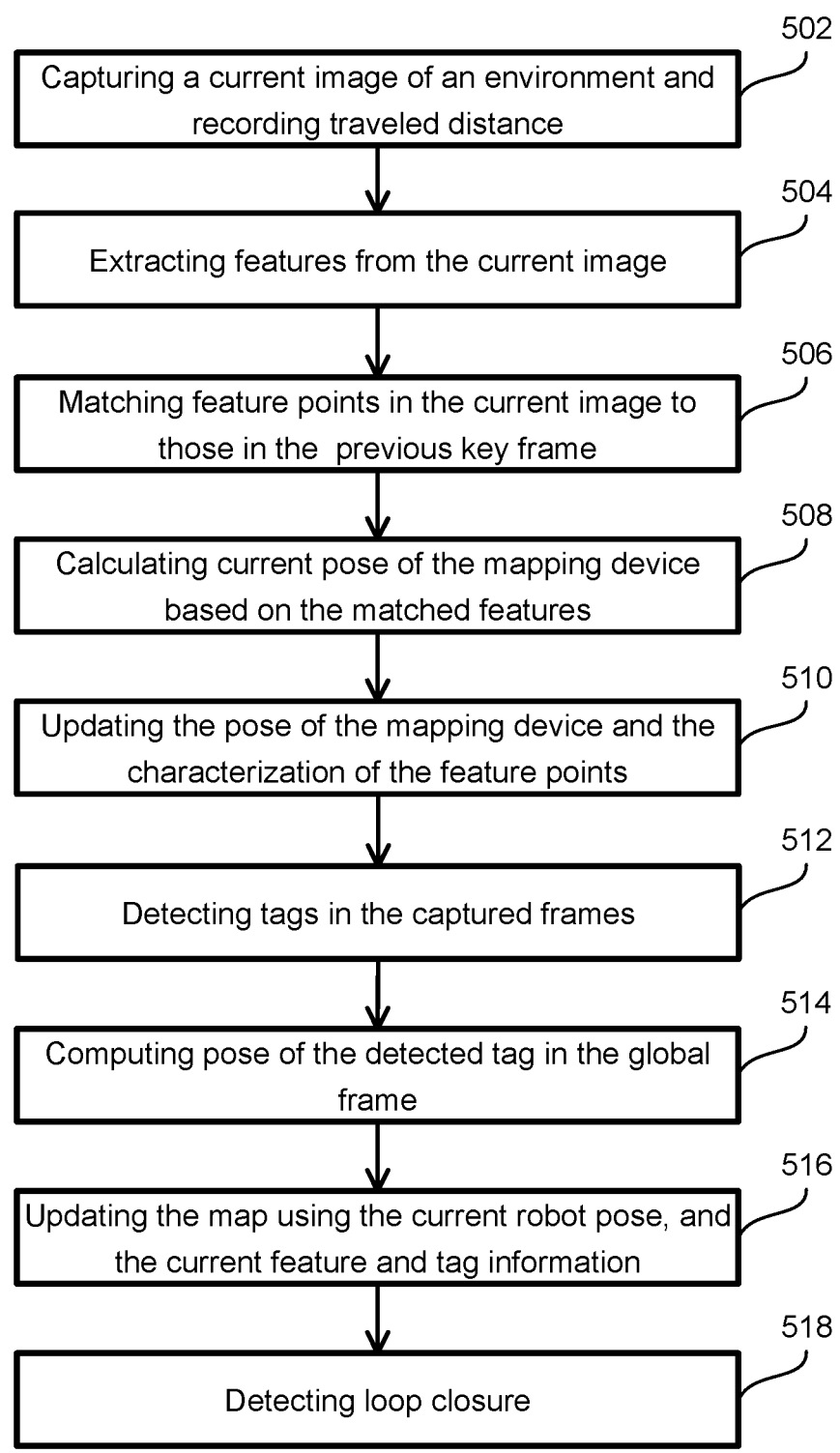
FIG. 5 schematically depicts a flowchart of a mapping method according to certain embodiments of the present invention.

In certain aspects, the present invention relates to a method of preparing a hybrid multimodal map. In certain embodiments, the number of layers of the multimodal map may be two to five. FIG. 5 is a flowchart showing a method of preparing a three-layer multimodal map according to certain embodiments of the present invention. In certain embodiments, the method 500 as shown in FIG. 5 may be implemented on a mapping device 100 as shown in FIG. 2. It should be particularly noted that, unless otherwise stated in the present invention, the steps of the method may be arranged in a different sequential order, and are thus not limited to the sequential order as shown in FIG. 5.

In certain embodiments, before the procedures shown in FIG. 5, the method may need to initialize a 3D map. Specifically, when the mapping application 118 is initialized, and there is no map available yet, the map module 132 is configured to construct a 3D map based on the first few captured frames. Basically, the first visual sensor 150 captures a plurality of images or frames (at least two), the feature extractor 120 extract feature points from the captured images, the feature matching module 122 matches the feature points in different images, the pose recovery module 124 calculates the pose of the mapping device 100 and the location of the features in the 3D space, and the mapping module 132, based on the locations of the matched feature points, constructs an initial 3D map. The constructed 3D map may further include key frames (images) and poses of the mapping device corresponding to each key frame. In certain embodiments, the LIDAR and the tag information are retrieved from the laser scans and images, and are added to the 3D map to form a 3D hybrid map, where the 3D hybrid map includes a bottom LIDAR occupation map layer, a feature point cloud layer with key frames and poses of the mapping device 100, and a tag layer with coordinates of the tags and the tag identifications. The three layers are associated with each other because they share the same coordinate system.

At procedure 502, a first sensor 150, such as a camera, and a first IMU/wheel encoder 170 are provided. The intrinsic parameters of the first sensor 150 is stored in the configuration file 140, which may include the optical center, the distortion, and the focal length of the camera. The first visual sensor 150 captures visual images, such as RGB images, of the environment, and the first IMU/wheel encoder 170 records respectively specific force and speed/distance/position to obtain traveled distance of the mapping device 100. In certain embodiments, the method further provides a LIDAR for collecting laser scans of the environment. In this step, the first sensor 150 captures a current frame, the LIDAR performs a current scan, and the first IMU/wheel encoder 170 records the distance traveled during the capturing of the previous image to the current image.

At procedure 504, the feature extractor 120 receives the current image captured by the first visual sensor 150, and upon receiving the current image, extracts feature from the current image, and sends the extracted features to the feature matching module 122. In certain embodiments, the feature extractor 120 also receive or retrieve intrinsic parameters of the first visual sensor 150 to pre-process the current image before extracting the features. In certain embodiments, the pre-processing of the current image may include one or more of converting the captured RGB image to a grayscale image, adjusting the format, the size, and the light balance of the current image, and correct distortion of the current image. The features are 2D features that include edge, corner, blobs, ridges, etc., and the extracted feature points are defined using the coordinates of the features in the current image and the calculated feature descriptors. In certain embodiments, the first visual sensor 150 may further include LIDAR, and the feature extractor 120 receives a current laser scan, and extract features from the current laser scan.

At procedure 506, upon receiving the extracted features from the feature extractor 120, the feature matching module 122 matches the features in the current image to the features in the immediate previous key frame (key image). In certain embodiments, the feature matching may also be performed by matching each feature point in the current image to the feature points in one or more previous images. In certain embodiments, the feature matching may also be performed by matching each feature point in the current image to the feature points in one or more recent key frames. In certain embodiments, when the current image is the first image, there is no need to perform the matching because there are no previous images to compare with. Once a feature point in the current image is matched with a feature point in the immediate previous key frame, the two corresponding feature points are associated. In certain embodiments, an adjusting function is performed to the matched feature points, such that after adjustment, the matched feature points have the same descriptor. In certain embodiments, each feature point in the current image is matched with feature points from several previous frames or previous key frames, and all the matched feature points are associated with each other and optionally adjusted to have the same descriptor. In certain embodiments, when LIDAR scans are available, the feature matching module 122 further matches the feature points in the laser scans. The matched image features are defined by their coordinates (u, v) in the current image, and the matched laser scan features are defined by their (direction, range) in the robot frames. When the matched information is available, the feature matching module 122 sends the matched information to the pose recovery module 124 for calculating current pose of the mapping device 100.

At procedure 508, upon receiving the matched feature information from the feature matching module 122, the pose recovery module 124 calculates the current pose of the mapping device 100 in the global frame defined by (x, y, yaw) and feature descriptor locations in the global frame (x, y, z, descriptor). Here the global frame means the coordinate system of the 3D multimodal map. The current pose of the mapping device 100 and the feature descriptor locations of the extracted feature, although use the coordinate system of the 3D multimodal map, are not stored in the 3D multimodal map yet. After obtaining the current pose of the mapping device 100 and the locations of the extracted feature points, the pose recovery module 124 sends the information to the pose updating module 126 for being updated and to the loop closure module 134 for detecting loop closure.

At procedure 510, upon receiving the current pose (x, y, yaw) of the mapping device 100 and the characterization of the feature points (x, y, z, descriptor) from the pose recovery module 124, and the relative pose change measured by the first IMU/wheel encoder 170 between the end of the last motion of the mapping device 100 and the end of the current motion, the pose updating module 126 updates the current pose of the mapping device 100 in the global frame, and updates the characterization of the feature points in the global frame. When the current pose of the mapping device 100 is updated, the pose updating module 126 sends the updated current pose of the mapping device 100 to other modules of the mapping device 100 for their use, and to the tag pose computing module 130 for computing current pose of the tag. The pose updating module 126 further sends the updated characterization of the feature points directly to the map module 132 or via the tag pose computing module 130.

After the procedure 502 and before the procedure 514, at procedure 512, upon receiving the captured current image from the first visual sensor 150, the tag detector 128 detects tags in the current image. Here the tags refer to the fiducial markers 180 in the current image. The tags include AprilTag or QR code, and the detection includes determining the identification of the tag and the coordinates of the tag in the current image. In certain embodiments, the detected tag is defined by (u, v, tag_ID), where (u, v) is the coordinate of the tag in the current image, and the tag_ID is the specific identification of the tag. The tag detector 128 then sends the detected tag to the tag pose computing module 130.

At procedure 514, upon receiving the tag location and identification (u, v, tag_ID) in the current image from the tag detector 128, the updated current pose of the mapping device 100 in the global frame (x, y, yaw) and the updated current feature points characterization (x, y, z, descriptor) in the global frame from the pose updating module 126, and the extrinsic calibration parameters of the first visual sensor 150, is configured to use the extrinsic calibration parameters and the tag location and identification to optimize the location of the fiducial markers 180, so as to obtain current pose of the tag in the global frame (x, y, z, tag_ID), where x, y, z are coordinates of the tag in the global frame. The tag pose computing module 130 is further configured to send the updated current pose of the mapping device 100 in the global frame (x, y, yaw), the updated current characterization of the feature points in the global frame (x, y, z, descriptor), and current pose of the tag in the global frame (x, y, z, tag_ID) to the map module 132. Kindly note x, y, z for the mapping device 100, for the feature points, and for the tag(s) are their corresponding locations in the global frame and are different from each other. In certain embodiments, when LIDAR is available, the tag pose computing module 130 also sends the matched LIDAR features received form the pose updating module 126 to the map module 132. The processing of the processing of the current laser scan is similar to the processing of the current image, except that there is no tag information in LIDAR. The whole process includes feature extractor, feature matching, pose recovery, pose update, map, and loop closure. The LIDAR data is same though all the processes. One slightly difference is at the pose recovery, image feature generates and uses descriptor match and RANSAC method to associate feature between current image and last image, while LIDAR use ICP (iterative closest point) method, in this case instead of point, feature is used, so iterative closest feature to associate current LIDAR feature with last LIDAR feature.

At procedure 516, upon receiving the updated current pose of the mapping device 100 in the global frame, the updated current characterization of the feature points in the global frame, and the computed pose of the tag in the global frame, the mapping module 132 updates the 3D multimodal map using the information. In certain embodiments, during the initialization of the mapping device where there is no 3D map available, the mapping module 132 is able to an initial 3D map based on the first few captured images. As an example, the first visual sensor 150 captures a number of images, the feature extractor 120 extract feature points from the capture images and determines the location of each feature points in its respective image, the feature matching module 122 matches the feature points in different images, the pose recovery module 124 recovers the current pose of the mapping device 100 in the global frame and the characterization of the feature points in the global frame, and the mapping module 132, based on the current pose of the mapping device and the characterization of the feature points, constructs the initial 3D map (projecting the 2D feature points into 3D space). If one or more tags are detected from the images by the tag detector 128, the tag pose computing module 130 can determine the 3D location of the tags based on the 2D coordinates of the tags in one or more captured images. When the tag information is added to the 3D map, the 3D map is now a multimodal map with different layers. When laser scans are available to calculate an occupancy map, the 3D multimodal map can also include an occupancy map layer. After initialization of the 3D multimodal map, the 3D multimodal map is continuously updated using the new captured images.

At procedure 518, the loop closure module 134 checks the current robot poses and the current feature descriptor location from the pose recovery module 124 and the 3D multimodal map from the map module 132, and detects possible loop closure. When loop closure is detected, the loop closure module 134 sends the detected loop closure to the pose updating module 126 for updating robot pose. In certain embodiments, the loop closure module 134 performs the detection by matching the newly obtained features with the features in the 3D multimodal map. When there are matched features, the loop closure detection module 134 may use the matched features to detect whether a loop of route is formed. In certain embodiments, the match of a tag is used to trigger loop closure determination. Because the characterization of the tag is much more accurate than the extracted feature points, the loop closure uses the matched tags to achieve fast and accurate loop closure detection.

Figure 6:
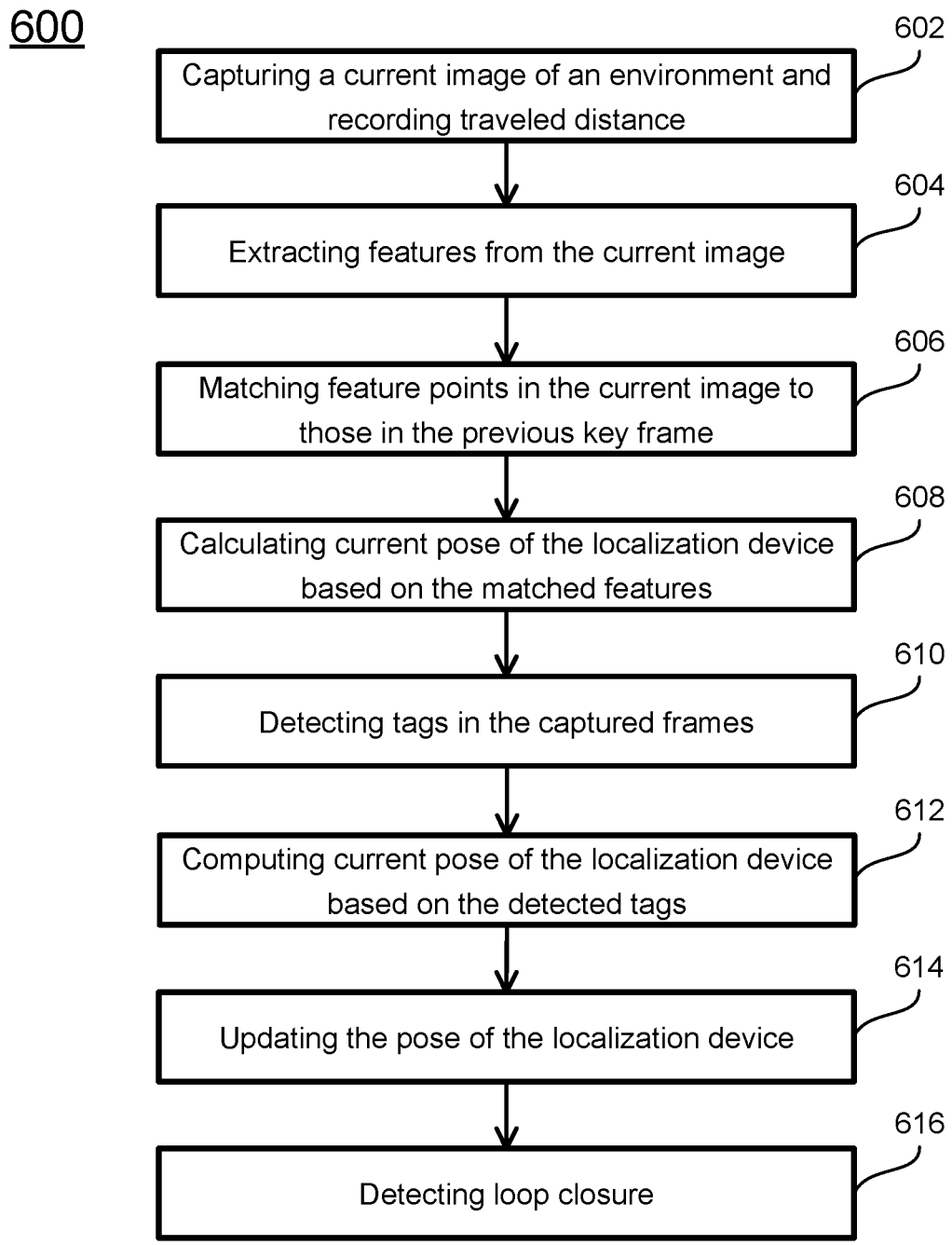
FIG. 6 schematically depicts a flowchart of a localization method according to certain embodiments of the present invention.

In certain aspects, the present invention relates to a method of using the 3D multimodal map prepared above for localization of a device such as a robotic device. FIG. 6 is a flowchart showing a method of using the three-layer multimodal map according to certain embodiments of the present invention. In certain embodiments, the method as shown in FIG. 6 may be implemented on a device as shown in FIG. 4, in which the resolution and quality of the hardware may not as good as those of the device for preparing the 3D multimodal map. It should be particularly noted that, unless otherwise stated in the present invention, the steps of the method may be arranged in a different sequential order, and are thus not limited to the sequential order as shown in FIG. 6.

At procedure 602, a second sensor 250, such as a camera, and a second IMU/wheel encoder 270 are provided. The second visual sensor 250 captures visual images, such as RGB images, of the environment, and the second IMU/wheel encoder 270 records respectively specific force and speed/distance/position to obtain traveled distance of the localization device 200. In certain embodiments, the method further provides a LIDAR for collecting laser scans of the environment. The environment where the localization device 200 operates is the same environment the mapping device 100 preparing the 3D multimodal map. In certain embodiments, the mapping device 100 and the localization device 200 are robotic devices that have different quality and cost. The quality and resolution of the second camera 250 may not be as high as that of the first camera 150, and the quality and resolution of the first second IMU/wheel encoder 270 may not be as high as that of the first IMU/wheel encoder 170. The intrinsic parameters of the second sensor 250 is stored in the system file 240, which may include the optical center, the distortion, and the focal length of the camera. Further, the system file 240 includes the 3D multimodal map prepared by the mapping device 100 as described above.

At procedure 604, the feature extractor 220 receives the current image captured by the second visual sensor 250, and upon receiving the current image, extracts feature from the current image; and sends the extracted features to the feature matching module 222. In certain embodiments, the feature extractor 220 also receive or retrieve intrinsic parameters of the second visual sensor 250 to pre-process the current image before extracting the features. In certain embodiments, pre-processing of the current image may include one or more of converting the captured RGB image to a grayscale image, adjusting the format, the size, and the light balance of the current image, and correct distortion of the current image. The features are 2D features that include edge, corner, blobs, ridges, etc., and the extracted feature points are defined using feature descriptors. In certain embodiments, the second visual sensor 250 may further include LIDAR, and the feature extractor 220 receives a current laser scan, and extract features from the current laser scan.

At procedure 606, upon receiving the extracted features from the feature extractor 220, the feature matching module 222 matches the features from the current frame to the features in the immediate previous key frame (key image).

In certain embodiments, the feature matching may also be performed by matching each feature point in the current image to the feature points in one or more previous images. In certain embodiments, the feature matching may also be performed by matching each feature point in the current image to the feature points in one or more recent key frames. In certain embodiments, when the current image is the first image, there is no need to perform the matching because there are no previous images to compare with. Once a feature point in the current image is matched with a feature point in the immediate previous key frame, the two corresponding feature points are associated, or labeled with a same identification. In certain embodiments, an adjusting function is performed to the matched feature points, such that after adjustment, the matched feature points have the same descriptor. In certain embodiments, each feature points in the current image is matched with feature points from several previous key frames, and all the matched feature points are associated with each other and optionally adjusted to have the same descriptor. In certain embodiments, when LIDAR scans are available, the feature matching module 222 further matches the feature points in the laser scans. The matched image features are defined by their coordinates (u, v) in the current image, and the matched laser scan features are defined by their (direction, range) in the robot frames. When the matched information is available, the feature matching module 222 sends the matched information to the pose recovery module 124 for calculating current pose of the localization device 200.

At procedure 608, upon receiving the matched feature information from the feature matching module 222, the pose recovery module 224 calculates the current pose of the localization device 200 in the global frame defined by (x, y, yaw) and feature descriptor locations in the global frame (x, y, z, descriptor). The current pose of the localization device 200 and the feature descriptor locations of the extracted features, although use the coordinate system of the 3D multimodal map, are not stored in the 3D multimodal map yet. After obtaining the current pose of the localization device 200 and the locations of the extracted feature points, the pose recovery module 224 sends the information to the pose updating module 230 and the loop closure module 232.

The procedures 610 and 612 are performed after the procedure 602 and before the procedure 614. At procedure 610, after receiving the captured current image from the second visual sensor 250, the tag detector 226 detects tags in the captured current image. Here the tag refers to the fiducial markers 180 in the current image. The tags include AprilTag or QR code, and the detection includes determining the identification of the tag and the coordinates of the tag in the current image. In certain embodiments, the detected tag is defined by (u, v, tag_ID), where (u, v) is the coordinates of the tag in the current image, and the tag_ID is the specific identification of the tag. The tag detector 226 then sends the detected tag to the robot pose computing module 228.

At procedure 612, upon receiving the tag location in the current image (u, v, tag_ID) from the tag detector 226 and the tag locations in the global frame (x, y, z, tag_ID) and camera pose in robot frame (x, y, z, roll, yaw, pitch) from the system file 240 (location and orientation of the camera 250 relative to the localization device 200), the robot pose computing module 228 computes the current pose of the localization device 200 in the global frame. The resulted pose is defined as (x, y, yaw) using the coordinate system of the 3D multimodal map, but the pose is not added to the 3D multimodal map. The robot pose computing module 228 then sends the current pose of the localization device 200 to the pose updating module 230.

At procedure 614, upon receiving the current pose of the localization device 200 from the pose recovery module 224, the current pose of the localization device 200 from the robot pose computing module 228, the relative pose change measured by the second IMU/wheel encoder 270, and when available, loop closure information from the loop closure module 232, the pose updating module 230 updates the current pose of the localization device 200. Kindly note the current pose of the localization device 200 from the pose recovery module 224 may be different from the current pose of the localization device 200 from the robot pose computing module 228. The current pose of the localization device 200 from the robot pose computing module 228 may be more accurate because it uses the location of the tag, which is normally more accurate than the determined location of the extracted features. When the current pose of the localization module 200 is updated by the pose updating module 230, the pose updating module 230 sends the updated current pose to other modules of the robotic device 200 for their use, and sends the updated current pose to the loop closure module 232.

At procedure 616, upon receiving the updated current pose of the localization device 200 from the pose updating module 230, receiving the poses of the robot and the feature descriptor ground truth location in the 3D multimodal map from the system file 240, and the current poses of the localization device 200 and feature descriptor location of the extracted features from the from the pose recovery module 224, the loop closure module 232 detects possible loop closure. When loop closure is detected, the loop closure module 232 sends the detected loop closure to the pose updating module 230 for updating current pose of the localization device 200. In certain embodiments, the loop closure module 232 performs the detection by matching the newly obtained features with the features in the 3D hybrid map. When there are matched features, the loop closure detection module 232 may use the matched features to detect whether a loop of route is formed. In certain embodiments, the tags are more reliable reference than the features, and the loop closure module 232 is preferably triggered by the matching of the detected tags with the tags in the 3D multimodal map.

In a further aspect, the present invention is related to a non-transitory computer readable medium storing computer executable code. The code, when executed at a processer 112 of the mapping device 100, may perform the method 500 as described above. In certain embodiments, the non-transitory computer readable medium may include, but not limited to, any physical or virtual storage media. In certain embodiments, the non-transitory computer readable medium may be implemented as the storage device 116 of the mapping device 100 as shown in FIG. 2.

In yet another aspect, the present invention is related to a non-transitory computer readable medium storing computer executable code. The code, when executed at a processer 212 of the localization device 200, may perform the method 600 as described above. In certain embodiments, the non-transitory computer readable medium may include, but not limited to, any physical or virtual storage media. In certain embodiments, the non-transitory computer readable medium may be implemented as the storage device 216 of the localization device 200 as shown in FIG. 4.

Figure 7:
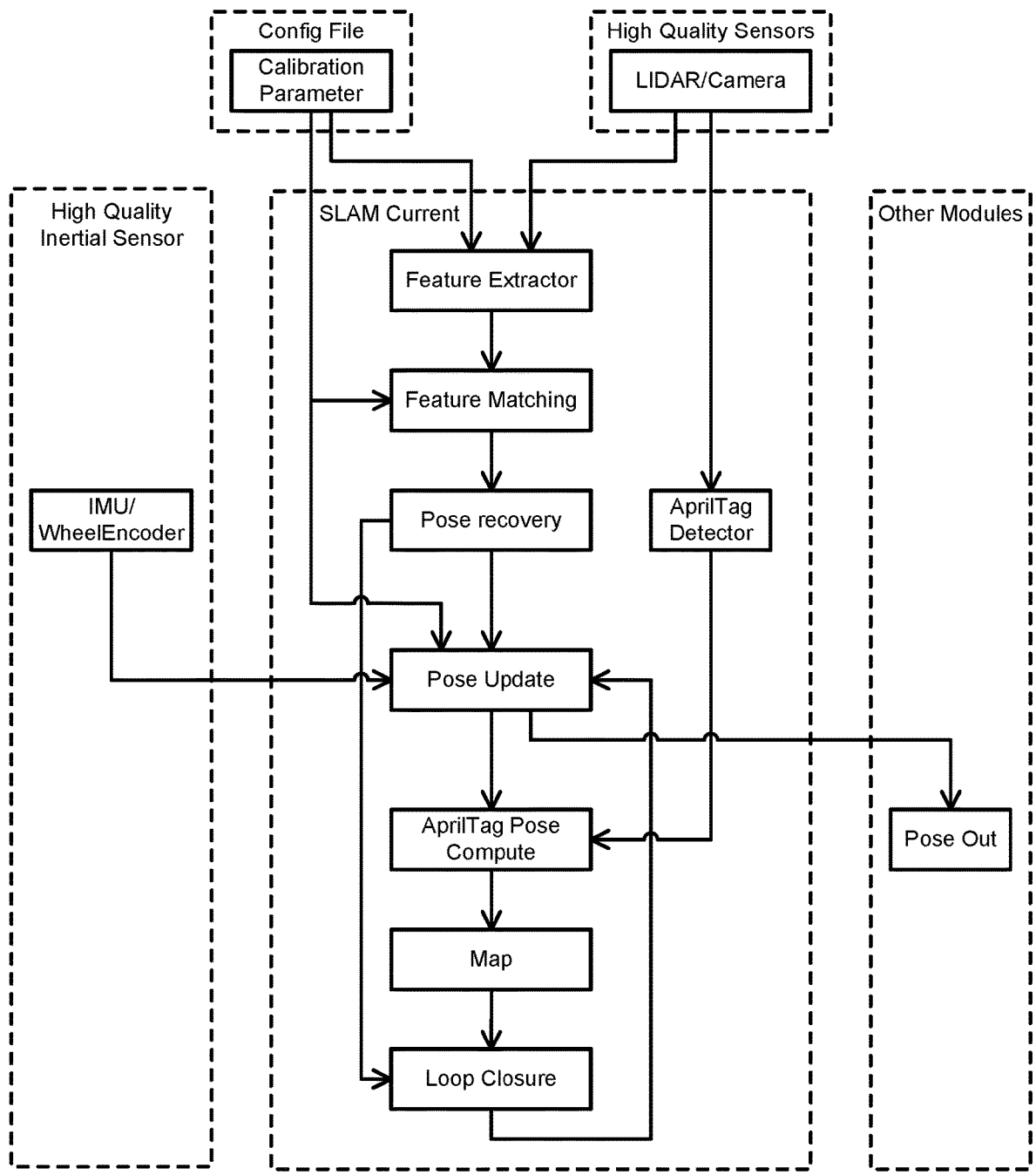
FIG. 7 schematically depicts an exemplary flowchart of a mapping method according to certain embodiments of the present invention.

FIG. 7 schematically depicts an exemplary flowchart of a mapping method according to certain embodiments of the present invention. The example is substantially similar to the flowchart shown in FIG. 5.

Figure 8:
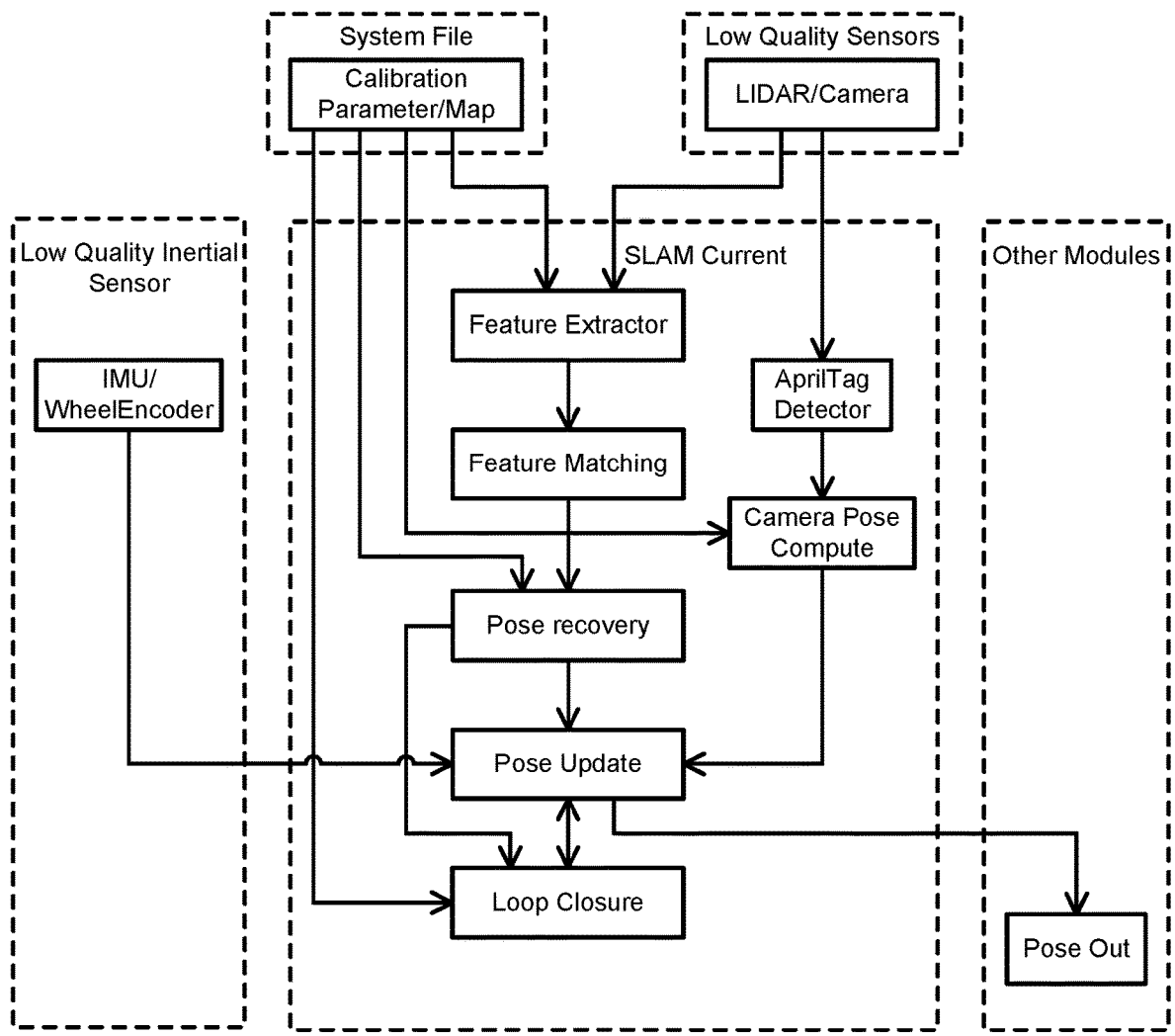
FIG. 8 schematically depicts an exemplary flowchart of a localization method according to certain embodiments of the present invention.

FIG. 8 schematically depicts an exemplary flowchart of a localization method according to certain embodiments of the present invention. The example is substantially similar to the flowchart shown in FIG. 6.

In certain embodiments, the mapping device 100 and the localization device 200 according to certain embodiments of the present invention include robotic devices, smart phones, tablets, computing devices, drones, or the like, and the environment includes an indoor environment such as a warehouse, or an outdoor environment. In certain embodiments, other applications can be combined using the high resolution, accurate 3D multimodal map. In certain embodiments, the detection of the tags, which have an accurate location in the environment, help the localization of the system.

In summary, certain embodiments of the present invention, among other things, have the following advantages over related art.

Firstly, the present invention provides a method to construct a hybrid map that have multiple layers. As an embodiment, the multimodal map includes three layers-a layer of feature point cloud, a layer of occupancy map, and a layer of tags. The three layers are associated with each other using a same coordinate system. Accordingly, a robotic device may use the multimodal map for fast and accurate localization based on detected tags in its captured frames.

Secondly, the loop closure may be triggered using the matched tags. Because the location of the tags in the 3D hybrid map is highly accurate, the loop closure triggered by the tags is also fast and accurate.

Thirdly, a high quality, expensive robotic device can be used to construct the high-resolution multimodal map. When an economic robotic device is used later, which may use low-cost sensors, the high-resolution multimodal map helps the economic robotic device navigate. Especially when the economic robotic device is used to pass a departure point repeatedly in an indoor environment, this method would speed up the pose initialization, reduce the computation load, and improve the state estimation accuracy.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for mapping and localization, comprising a first robotic device for preparing a multilayer map and a plurality of tags placed in predetermined positions in an environment, wherein the first robotic device comprises a first visual sensor for capturing first images of the environment and a first controller, the first controller comprises a first processor and a first storage device storing first computer executable code, and the first computer executable code, when executed at the first processor, is configured to:
construct a feature point cloud layer of the environment using the first images captured by the first visual sensor;
build a tag layer comprising identifications of the plurality of tags and locations of the plurality of tags; and
form the multilayer map using the feature point cloud layer and the tag layer, wherein the feature point cloud layer and the tag layer share a same coordinate system,
wherein the first robotic device further comprises at least one of a first inertial measurement unit (IMU) and a first wheel encoder mounted thereon, and wherein the first computer executable code, when executed at the first processor, is configured to update the multilayer map by:
capturing a current image by the first visual sensor;
extracting features from the current image;
matching the features extracted from the current image to features in an immediate previous key frame of the first robotic device, so as to obtain matched features;
recovering a current pose of the first robotic device based on the matched features;
updating the current pose of the first robotic device using measurement from the first IMU or the first wheel encoder to obtain updated current pose of the first robotic device;
detecting the tags from the current image;
computing poses of the tags based on the updated current pose of the first robotic device and location of the detected tags in the current image; and
updating the multilayer map based on the updated current pose of the first robotic device and the poses of the tags.

2. The system of claim 1, wherein the first robotic device further comprises a first light detection and ranging (LIDAR) device, the first executed computer executable code is configured to construct an occupancy map using scans captured by the first LIDAR device, and incorporate the occupancy map into the multilayer map as an occupancy map layer, such that the occupancy map layer, the feature point cloud layer and the tag layer has the same coordinate system.

3. The system of claim 1, wherein the first computer executable code, when executed at the first processor, is further configured to:
detect loop closure by matching the detected tags to the tags recorded in the tag layer of the multilayer map; and
further update the updated current pose of the first robotic device using the detected loop closure.

4. A system for mapping and localization, comprising a first robotic device for preparing a multilayer map and a plurality of tags placed in predetermined positions in an environment, wherein the first robotic device comprises a first visual sensor for capturing first images of the environment and a first controller, the first controller comprises a first processor and a first storage device storing first computer executable code, and the first computer executable code, when executed at the first processor, is configured to:
construct a feature point cloud layer of the environment using the first images captured by the first visual sensor;
build a tag layer comprising identifications of the plurality of tags and locations of the plurality of tags; and
form the multilayer map using the feature point cloud layer and the tag layer, wherein the feature point cloud layer and the tag layer share a same coordinate system, wherein the system further comprises a second robotic device, wherein the second robotic device comprises a second visual sensor for capture second images of the environment and a second controller, resolution of the second visual sensor is lower than resolution of the first visual sensor, the second controller comprises a second processor and a second storage device storing second computer executable code, and the second computer executable code, when executed at the second processor, is configured to localize the second robotic device by matching tags detected from the second images to location of the tags stored in the multilayer map.

5. The system of claim 4, wherein the second robotic device further comprises a second light detection and ranging (LIDAR) device, the second executed computer executable code is configured to match features detected in scans of the LIDAR device to features stored in the occupancy map layer.

6. The system of claim 4, wherein the second robotic device further comprises at least one of a second inertial measurement unit (IMU) and a second wheel encoder mounted thereon, and wherein the second computer executable code, when executed at the second processor, is configured to use the multilayer map by:
capturing a current localization image by the second visual sensor;
extracting features from the current localization image;
matching the features extracted from the current localization image to features in an immediate previous key frame of the second robotic device, so as to obtain matched features;
recovering a first current pose of the second robotic device based on the matched features;
detecting the tags from the current localization image;
computing a second current pose of the second robotic device based on the multilayer map and the detected tags; and
updating pose of the second robotic device using the first current pose, the second current pose, and measurement from the first IMU or the first wheel encoder, to obtain updated current pose of the second robotic device.

7. The system of claim 6, wherein the second computer executable code, when executed at the second processor, is further configured to update the updated current pose of the second robotic device by:
detecting loop closure by matching the detected tags to the tags recoded in the tag layer of the multilayer map; and
further updating the updated current pose of the second robotic device using the detected loop closure.

8. A method for mapping and localization, comprising:
constructing a feature point cloud layer of an environment using first images captured by a first visual sensor of a first robotic device;
building a tag layer comprising identifications and locations of a plurality of tags laced in predetermined positions in the environment;
forming a multilayer map using the feature point cloud layer and the tag layer, wherein the feature point cloud layer and the tag layer share a same coordinate system; and
updating the multilayer map by:
capturing a current image by the first visual sensor;
extracting features from the current image;
matching the features extracted from the current image to features in an immediate previous key frame of the first robotic device, so as to obtain matched features;
recovering a current pose of the first robotic device based on the matched features;
updating the current pose of the first robotic device using measurement from at least one of a first inertial measurement unit (IMU) and a first wheel encoder mounted on the first robotic device to obtain updated current pose of the first robotic device;
detecting the tags from the current image;
computing poses of the tags based on the updated current pose of the first robotic device and location of the detected tags in the current image; and
updating the multilayer map based on the updated current pose of the first robotic device and the poses of the tags.

9. The method of claim 8, further comprising:
constructing an occupancy map using scans captured by a first light detection and ranging (LIDAR) device; and
incorporating the occupancy map into the multilayer map as an occupancy layer, such that the occupancy map layer, the feature point cloud layer and the tag layer has the same coordinate system.

10. The method of claim 8, further comprising updating the multilayer map by:
detecting loop closure by matching the detected tags to the tags recorded in the tag layer of the multilayer map; and
further updating the updated current pose of the first robotic device using the detected loop closure.

11. A method for mapping and localization, comprising:
constructing a feature point cloud layer of an environment using first images captured by a first visual sensor of a first robotic device;
building a tag layer comprising identifications and locations of a plurality of tags laced in predetermined positions in the environment;
forming a multilayer map using the feature point cloud layer and the tag layer, wherein the feature point cloud layer and the tag layer share a same coordinate system; and
localizing a second robotic device by matching tags detected from second images of the environment captured by a second visual sensor of the second robotic device to locations of the tags in the multilayer map, wherein resolution of the second visual sensor is lower than resolution of the first visual sensor.

12. The method of claim 11, further comprising:
matching features detected in scans of a second light detection and ranging (LIDAR) device to features stored in the occupancy map layer.

13. The method of claim 11, further comprising using the multilayer map by:
capturing a current localization image by the second visual sensor;
extracting features from the current localization image;
matching the features extracted from the current localization image to features in an immediate previous key frame of the second robotic device, so as to obtain matched features;
recovering a first current pose of the second robotic device based on the matched features;
detecting the tags from the current localization image;
computing a second current pose of the second robotic device based on the multilayer map and the detected tags; and
updating pose of the second robotic device using the first current pose, the second current pose, and measurement from at least one of a second inertial measurement unit (IMU) and a second wheel encoder mounted on the second robotic device, to obtain updated current pose of the second robotic device.

14. The method of claim 13, further comprising updating the updated current pose of the second robotic device by:
   detecting loop closure by matching the detected tags to the tags recoded in the tag layer of the multilayer map; and
   further updating the updated current pose of the second robotic device using the detected loop closure.

15. A non-transitory computer readable medium storing computer executable code, wherein the computer executable code, when executed at a processor of a controller of a first robotic device, is configured to:
   construct a feature point cloud layer of an environment using first images captured by first visual sensor of the first robotic device;
   build a tag layer comprising identifications of a plurality of tags and locations of the plurality of tags, wherein the tags are placed in predetermined positions in the environment;
   form a multilayer map using the feature point cloud layer and the tag layer, wherein the feature point cloud layer and the tag layer share a same coordinate system;
   capture a current image by the first visual sensor;
   extract features from the current image;
   match the features extracted from the current image to features in an immediate previous key frame of the first robotic device, so as to obtain matched features;
   recover a current pose of the first robotic device based on the matched features;
   update the current pose of the first robotic device using measurement from at least one of a first inertial measurement unit (IMU) and a first wheel encoder mounted on the first robotic device to obtain updated current pose of the first robotic device;
   detect the tags from the current image;
   compute poses of the tags based on the updated current pose of the first robotic device and location of the detected tags in the current image;
   update the multilayer map based on the updated current pose of the first robotic device and the poses of the tags;
   detect loop closure by matching the detected tags to the tags recorded in the tag layer of the multilayer map; and
   further update the updated current pose of the first robotic device using the detected loop closure.

16. The non-transitory computer readable medium of claim 15, wherein the computer executable code is configured to:
   localize a second robotic device by matching tags detected from second images of the environment captured by a second visual sensor of the second robotic device to locations of the tags in the multilayer map, wherein resolution of the second visual sensor is lower than resolution of the first visual sensor.

17. The non-transitory computer readable medium of claim 16, wherein the computer executable code is configured to:
   capture a current localization image by the second visual sensor;
   extract features from the current localization image;
   match the features extracted from the current localization image to features in an immediate previous key frame of the second robotic device, so as to obtain matched features;
   recover a first current pose of the second robotic device based on the matched features;
   detect the tags from the current localization image;
   compute a second current pose of the second robotic device based on the multilayer map and the detected tags;
   update pose of the second robotic device using the first current pose, the second current pose, and measurement from at least one of a second inertial measurement unit (IMU) and a second wheel encoder mounted on the second robotic device, to obtain updated current pose of the second robotic device;
   detect loop closure by matching the detected tags to the tags recoded in the tag layer of the multilayer map; and
   further update the updated current pose of the second robotic device using the detected loop closure.

* * * * *